US006616739B1

(12) United States Patent
Spanos

(10) Patent No.: US 6,616,739 B1
(45) Date of Patent: Sep. 9, 2003

(54) CORROSION INHIBITED CHLORIDE SALT COMPOSITIONS

(75) Inventor: James D. Spanos, Windsor (CA)

(73) Assignee: General Chemical Industrial Products Inc., Parsippany, NJ (US)

( * ) Notice: Subject to any disclaimer, the term of this patent is extended or adjusted under 35 U.S.C. 154(b) by 0 days.

(21) Appl. No.: 10/282,650

(22) Filed: Oct. 29, 2002

(51) Int. Cl.[7] .............................. C09K 3/18; C23F 11/00
(52) U.S. Cl. ................... 106/14.44; 106/13; 106/14.05; 106/14.11; 106/14.21; 252/70
(58) Field of Search .......................... 106/14.05, 14.11, 106/14.44, 13, 14.21; 252/70

(56) References Cited

U.S. PATENT DOCUMENTS

| | | | |
|---|---|---|---|
| 5,635,101 A | 6/1997 | Janke et al. | 252/70 |
| 6,299,793 B1 | 10/2001 | Hartley et al. | 252/70 |
| 6,436,310 B1 * | 8/2002 | Hartley et al. | 252/70 |
| 6,440,325 B1 * | 8/2002 | Hartley et al. | 252/70 |

* cited by examiner

*Primary Examiner*—Anthony J. Green
(74) *Attorney, Agent, or Firm*—Arthur J. Plantamura

(57) ABSTRACT

A corrosion inhibited chloride salt is provided containing 30–38% by weight calcium chloride and up to 50% by weight based on the weight of the salt, of honey. This composition reduces the corrosivity of chloride salt up to as much as about 70% compared to that of the untreated sodium chloride solution. The corrosion-inhibited salt finds uses in a variety of applications, such as, for roadway deicing, freezeproofing, concrete additive and for dust suppression for example.

12 Claims, No Drawings

CORROSION INHIBITED CHLORIDE SALT COMPOSITIONS

This invention relates to a corrosion inhibited chloride salt formulation. More particularly, this invention relates to chloride salt composition such as calcium chloride, magnesium chloride, sodium chloride and potassium chloride and blends thereof containing a corrosion inhibitor composition. These compositions are useful not only as roadway deicer but also in various other applications in which chloride salts, in solution or as a solid, provide an important function in such applications as freezeproofing, refrigeration, dust control, concrete additive and the like in which the chloride salts are used and in which corrosion presents a direct or indirect problem.

BACKGROUND OF INVENTION

Chloride salt solutions of calcium, magnesium, sodium and potassium sodium have been used for deicing of road and roadway structures for many years. Sodium chloride is readily available and in inexpensive. However, the use of sodium chloride or the primary deicer has several disadvantages; it has an adverse effect on roadside vegetation and the groundwater, and it severely corrodes roadside barriers, bridges and the like, as well as the vehicles that drive over them and the equipment used to apply them. This adds to the overall costs of using sodium chloride. Thus a search had been ongoing for some time to replace sodium chloride as a deicer with a less corrosive material.

Other salts as the primary deicing agents have been suggested, but either they are too expensive, unavailable in quantity, they are also substantially corrosive and / or do not function efficiently in the proper concentration and/or at the desired deicing temperature ranges.

Calcium chloride, an effective deicer and freeze depressant for various active uses and, is less corrosive than sodium chloride, but it is still corrosive to metals as are the other chloride salts, e.g., magnesium and potassium. The use of calcium chloride as a deicer composition is advantageous because it generates heat when it comes in contact with solidified water, such as snow and or ice, thereby further promoting the deicing process. Likewise, chloride salts, calcium and magnesium in particular, are used for a variety of applications such as freezeproofing, dust control, concrete additives, to name a few, where corrosion may be a problem. Direct and indirect contact of chlorides with application equipment, processing equipment and various other metal components or metal structures has always been a concern. Therefore, the formulation of an inexpensive, less corrosive chloride provides an opportunity in many areas where chlorides are used today.

Various corrosion inhibitors have been tried for chloride salts. For example the use of chromates as corrosion inhibitors for chloride brine solutions is known; however, the use of chromates is being discouraged because of the adverse impact they have on the environment. The use of nitrites such as sodium, calcium, potassium and the like, has also been suggested, but a high level of the nitrite content with the chloride salt is required as a corrosion inhibitor making nitrite an impractical additive, particularly for large scale applications. Other known corrosion inhibitors include phosphates, borates, amines, molybdates, hydroquinone, gluconates and impure sugar sources such as molasses. However, none of the known prior art formulations are regarded as sufficient to inhibit corrosion to the desired practical and environmentally desired level.

SUMMARY OF THE INVENTION

In accordance with the invention, I have discovered that an inexpensive, non-corrosive compositions of chloride salts, primarily the chloride salts of calcium, magnesium, sodium and potassium, and preferably calcium chloride salts can be prepared comprising an aqueous solution of such salts and honey. Solid form compositions of the chloride and honey are also contemplated. In the corrosion inhibited compositions of the invention, proportion of up to about 50% by weight of honey based on the weight of the chloride salt can be employed. However, for most applications, the honey content in the formulation of the invention comprises from about 500 to about 110,000 ppm based on the weight of the salt and preferably about 4000 to 100,000 ppm. The non-corrosive formulations may comprise as little as 0.5–2.0% by volume of honey and still comply with criteria of a 70% reduction in corrosion with respect to that of sodium chloride solutions without corrosion inhibition.

DETAILED DESCRIPTION OF THE INVENTION

Calcium chloride and magnesium chloride, in particular, are commercially available in the form of brine solutions at various concentrations, and are available also as a solid product. The solutions can be shipped as about 15 to 50% preferably 18–45% by weight of calcium chloride with the resulting concentrations being a suitable deicer composition. The magnesium chloride is shipped as an 18–35% solution. Untreated, these solutions are corrosive to metals such as bridge structures, concrete barriers, metal signs and lighting, as well as vehicles and application equipment. Solution containing primarily calcium chloride may contain also varying amounts of the magnesium salt and if other salts such as sodium chloride and potassium chloride The calcium chloride solutions useful herein contain from about 18–38% by weight of calcium chloride may contain, as well, relatively minor amounts, i.e., less that 5% and most frequently less than one percent of the chloride salts of magnesium sodium and potassium. Such solutions contain up to 1.0 ppm of free chlorine, derived from calcium hypochlorite. When the calcium chloride is used as flake or pellet, it can be sprayed with the corrosion-inhibiting additive in the desired amounts to obtain the needed reduction in corrosion resistance.

The honey additive is available in several varieties that primarily result from the varying flower type or time of season it is harvested. Resulting differences in the color affect the appearance and or the taste of the honey that have no bearing on the effectiveness as an inhibitor.

I have found that honey is an effective and most practical anti-corrosion agent for chloride salts and in particular for calcium chloride and magnesium chloride. I have found that beneficial effect of honey is substantially superior over other known corrosion inhibiting additives. It is know that honey differs significantly in its chemical constituent composition from other sweetening agents. I have discovered that it is the presence of these unique constituent that impacts the unexpected anticorrosive advantageous accordance with the invention. The unique attributes contributed by honey are due to the presence and/or quantity levels not found in other sweetener constituents, which include acids, minerals, proteins and flavonoids that contain large quantities of antioxidants and honey enzymes; especially diastase, invertase, catalase and gluconic acid. All these characteristics when combined in the unique mixture known as honey provide benefits that are varied and unique.

The corrosion inhibited solutions of the invention have a freezing point of less than 0° F. and can be maintained to −20° F. without agitation.

The invention will be described in further detail by the following examples. However, it is not intended that the invention, except as required by the claims, be limited to the details provided. For the examples, the percentages specified are by weight.

In the illustrative examples that follow in preparing the honey for handling and storage, the honey is mixed into a 35–40% calcium chloride solution in a 1:1 ratio. The resulting mixture both stabilizes the honey from possible crystallizing and permits the honey to be dispensed at ambient temperatures and extending to to 0° F.

Corrosion testing was done according to NACE Standard TM-01-69 PNS modified. In accordance with this test, mild steel metal samples i.e., steel coupons, having a demsion of 1.25"OD×0.25"ID×0.03125" are;

1) cleaned, dried, weighed and alternately;
2) dipped into a brine solution for 10 minutes; and
3) withdrawn from the solution and exposed to air for 50 minutes, over a period of 72 hours.

The coupons 1.25"OD×0.25"ID×0.03125" are weighed before and after the above test, and the amount of metal lost determined as corrosion. Corrosion is expressed as mils per year (MPY).

Various sources of honey were tried as a corrosion inhibitor including (A) White clover honey (B) White acacia honey. The results are shown in the following Table:

| Honey Type | Honey Concentration, ppm | Corrosion Reduction, % |
| --- | --- | --- |
| A | 1,000 | 12.2 |
| A | 2,000 | 18.1 |
| A | 3,000 | 30.7 |
| B | 4,000 | 57.2 |
| A | 5,000 | 73.3 |
| B | 6,000 | 74.2 |
| B | 7,000 | 74.9 |
| A | 8,000 | 75.2 |
| B | 9,000 | 75.8 |
| A | 10,000 | 75.8 |
| A | 15,000 | 77.5 |
| B | 20,000 | 78.4 |
| B | 100,000 | 80.2 |

The pH of the raw honey is approximately 3.0, and the addition of the honey to the brine solution, i.e., the calcium and/or magnesium chloride brine solution, results in the respective solution pH being reduced. The formation of a darker amber color occurred when the honey was added to a solution with a pH above 8.3 and an overall pH above 6.0. When the honey was added to a brine solution with a pH lower than 8.3 and an overall value below 6.0, the formation of the color was very faint. This difference in the pH or color formation did not detract from the effectiveness of the inhibition properties.

Although the present invention has been described in terms of specific embodiments, various changes can be made, including varying the concentration of the chloride solution and the additives. Thus the invention is only meant to be limited by the scope of the appended claims.

What is claimed is:

1. A corrosion inhibitor composition comprising a chloride salt composition comprising a chloride salt selected from the group consisting of calcium, magnesium, sodium and potassium and mixtures thereof containing from about 15–50% by weight of said salt and from about 500 to about 110,000 ppm based on the weight of the salt, of honey or honey concentrates.

2. The composition of claim 1 wherein the chloride salt is primarily calcium chloride.

3. The composition of claim 1 wherein the chloride salt is primarily magnesium chloride.

4. A composition according to claim 1 wherein the salt is primarily calcium chloride in a solution concentration of about 18–45% and the honey is present at a concentration of between about 4000 ppm and 100,000 ppm.

5. A composition according to claim 1 wherein the honey is selected from the group constsing of white clover honey, white acorn honey and mixtures thereof.

6. A composition according to claim 3 wherein the honey is selected from the group constsing of white clover honey, white acorn honey and mixtures thereof.

7. A composition according to claim 1 wherein the salt is primarily magnesium chloride in an aqueous solution concentration of about 18 to 35 weight percent.

8. An aqueous brine solution comprising from about 15 to about 50 weight percent salt selected from the group consisting of calcium chloride, magnesium chloride, sodium chloride and potassium chloride and mixtures thereof and containing from about 1000 to about 100,000 ppm honey.

9. The brine solution of claim 8 wherein the salt is primarily calcium chloride.

10. The brine solution of claim 8 wherein the salt is primarily magnesium chloride.

11. The brine solution of claim 8 wherein the brine solution is a blend of calcium chloride and magnesium chloride.

12. A roadway deicer and dust control solution comprising the corrosion inhibitor composition of claim 1.

* * * * *